(12) United States Patent
Adzima et al.

(10) Patent No.: US 8,802,232 B2
(45) Date of Patent: Aug. 12, 2014

(54) POWDER COATED ROVING FOR MAKING STRUCTURAL COMPOSITES

(75) Inventors: Leonard J. Adzima, Pickerington, OH (US); Michael A. Strait, Sunbury, OH (US); William G. Hager, Westerville, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 502 days.

(21) Appl. No.: 12/688,165

(22) Filed: Jan. 15, 2010

(65) Prior Publication Data
US 2010/0203329 A1 Aug. 12, 2010

Related U.S. Application Data

(60) Continuation-in-part of application No. 10/858,692, filed on Jun. 2, 2004, now Pat. No. 7,648,733, which is a division of application No. 09/938,267, filed on Aug. 22, 2001, now abandoned.

(60) Provisional application No. 60/295,707, filed on Jun. 4, 2001.

(51) Int. Cl.
*B32B 9/00* (2006.01)

(52) U.S. Cl.
USPC ........... 428/392; 428/375; 428/378; 428/391; 427/386; 523/501

(58) Field of Classification Search
None
See application file for complete search history.

(56) References Cited

U.S. PATENT DOCUMENTS

| 4,530,860 A * | 7/1985 | Johnson | 427/386 |
| 4,614,678 A | 9/1986 | Ganga | |

(Continued)

FOREIGN PATENT DOCUMENTS

| WO | 96/28258 | 9/1996 |
| WO | 02/98961 | 12/2002 |

OTHER PUBLICATIONS

K.L. Loewenstein, "The Manufacturing Technology of Continuous Glass Fibers", pp. 297-298, Elsevier, 1993.
Woolard et al., Jounal of Electrostatics, "Electric Field Modeling for Electrostatic Power Coating of a Continuous Fibre Bundle", vol. 35, issue 4, Sep. 1995, pp. 373-387.

(Continued)

*Primary Examiner* — Jill Gray
(74) *Attorney, Agent, or Firm* — Calfee, Halter & Griswold LLP

(57) ABSTRACT

A powder coated roving material for making structural parts is provided. The powder coated roving includes a bundle of fibers at least substantially coated with a powder coating material. The bundle is formed of a plurality of inner fibers and a plurality of outer fibers surrounding the inner fibers. The size composition maintains the fibers in a bundled orientation during processing and releases the fibers during molding. The size composition includes an epoxy resin emulsion containing at least one surfactant and a solid epoxy resin having an epoxy equivalent weight from about 450 to about 950, at least one epoxy silane coupling agent, at least one non-ionic lubricant, at least one cationic lubricant, and at least one organic acid. In addition, the size composition may have an acetone solubility from about 30% to about 75%. A method of making a composite roving is also provided.

20 Claims, 7 Drawing Sheets

(56) References Cited

U.S. PATENT DOCUMENTS

| | | | |
|---|---|---|---|
| 4,713,139 A | 12/1987 | Ganga | |
| 4,933,381 A * | 6/1990 | Hager | 523/414 |
| 4,948,574 A | 8/1990 | Sasaki et al. | |
| 5,093,155 A | 3/1992 | Miyazaki et al. | |
| 5,094,883 A | 3/1992 | Muzzy et al. | |
| 5,171,630 A | 12/1992 | Muzzy et al. | |
| 5,198,281 A | 3/1993 | Muzzy et al. | |
| 5,296,064 A | 3/1994 | Muzzy et al. | |
| 5,302,419 A | 4/1994 | Muzzy | |
| 5,360,661 A | 11/1994 | Muzzy | |
| 5,380,477 A | 1/1995 | Kent et al. | |
| 5,409,757 A | 4/1995 | Muzzy et al. | |
| 5,605,757 A * | 2/1997 | Klett | 428/392 |
| 5,756,206 A | 5/1998 | Davies et al. | |
| 5,789,329 A | 8/1998 | Eastes et al. | |
| 6,054,177 A | 4/2000 | Endoh et al. | |
| 6,565,944 B1 | 5/2003 | Hartness et al. | |
| 6,616,971 B2 | 9/2003 | Evans | |
| 6,630,231 B2 | 10/2003 | Perez et al. | |
| 6,890,650 B2 * | 5/2005 | Hedden | 428/391 |
| 7,648,733 B2 | 1/2010 | Adzima | |
| 2002/0187346 A1 | 12/2002 | Adzima | |

OTHER PUBLICATIONS

International Search Report and Written Opinion from PCT/US02/16431 dated Aug. 13, 2002.
International Preliminary Examination Report from PCT/US02/16431 dated Aug. 14, 2003.
Advisory action from U.S. Appl. No. 09/935,267 dated Feb. 25, 2004.
Office action from U.S. Appl. No. 09/935,267 dated Dec. 15, 2003.
Office action from U.S. Appl. No. 09/935,267 dated Apr. 9, 2003.
Office action from U.S. Appl. No. 10/858,692 dated Jun. 10, 2005.
Office action from U.S. Appl. No. 10/858,692 dated Nov. 17, 2005.
Advisory action from U.S. Appl. No. 10/858,692 dated Feb. 6, 2006.
Panel Decision from U.S. Appl. No. 10/858,692 dated Apr. 21, 2006.
Office action from U.S. Appl. No. 10/858,692 dated Aug. 10, 2006.
Office action from U.S. Appl. No. 10/858,692 dated Mar. 12, 2008.
Office action from U.S. Appl. No. 10/858,692 dated Sep. 12, 2008.
Office action from U.S. Appl. No. 10/858,692 dated Mar. 11, 2009.
Advisory action from U.S. Appl. No. 10/858,692 dated May 27, 2009.
Notice of Allowance from U.S. Appl. No. 10/858,692 dated Sep. 25, 2009.

* cited by examiner

| SAMPLE DESCRIPTION | TENSILE STRESS ksi | TENSILE MODULUS 10^6psi | FLEX STRESS ksi | UNNOTCH IZOD ftlb/in | NOTCH IZOD ftlb/in | GLASS CONTENT % |
|---|---|---|---|---|---|---|
| ME2000, SRIM PICK-UP BOX | 26 | 1.6 | 36 | 30 | 21 | 53 |
| "905 SMC" - 50% 905AB IN VE | 26 | 2.1 | 41 | — | 11 | 50 |
| COMPOSITE ROVING, 70% GLASS | 38 | 2.7 | 61 | 48 | 34 | 69 |
| COMPOSITE ROVING, 75% GLASS | 38 | 2.8 | 52 | 51 | 36 | 76 |

POWDER COATED ROVING FOR MAKING STRUCTURAL COMPOSITES

CROSS REFERENCE TO RELATED APPLICATIONS

This application is a continuation-in-part of U.S. patent application Ser. No. 10/858,692 entitled "Powder Coated Roving For Making Structural Composite" filed Jun. 2, 2004 (allowed), which is a divisional of U.S. patent application Ser. No. 09/935,267 entitled "Powder Coated Roving For Making Structural Composite" filed Aug. 22, 2001 (abandoned), which in turn claims domestic priority to U.S. Provisional Patent Application 60/295,707 entitled "Powder Coated Roving For Making Structural Composite" filed on Jun. 4, 2001. The entire content of these applications is expressly incorporated herein by reference in their entireties.

TECHNICAL FIELD AND INDUSTRIAL APPLICABILITY OF THE INVENTION

The present invention relates generally to structural composites, and more specifically, to powder coated rovings for making structural composites.

BACKGROUND OF THE INVENTION

Structural composites are used in a wide variety of applications that require plastic parts having a minimum threshold of mechanical properties such as strength and impact resistance. Composites are typically made by introducing glass, or other reinforcing fibers, to a thermoplastic or thermosetting polymer material. The glass fiber and polymer material are mixed together and formed into a composite part in a wide variety of methods, including compression and injection molding. Examples of structural composites include sheet molding compound (SMC) and structural reaction injection molding (SRIM).

Structural composites are formed using glass reinforcements that provide dimensional stability and excellent mechanical properties to the resulting composites. For example, glass fibers provide dimensional stability as they do not shrink or stretch in response to changes in atmospheric conditions. In addition, glass fibers have high tensile strength, heat resistance, moisture resistance, and high thermal conductivity. It is known in the art that glass fiber-reinforced polymer composites possess higher mechanical properties compared to unreinforced polymer composites, provided that the reinforcement fiber surface is suitably modified by a sizing composition. Thus, better dimensional stability, tensile strength and modulus, flexural strength and modulus, impact resistance, and creep resistance may be achieved with glass fiber-reinforced composites.

Typically, glass fibers are formed by attenuating streams of a molten glass material from a bushing. An aqueous sizing composition, or chemical treatment, is typically applied to the fibers after they are drawn from the bushing. After the fibers are treated with the aqueous sizing composition, they may be wound onto a collet, packaged, dried, and wound together into a continuous roving. The roving may subsequently be chopped for use in a molding process for making a structural composite.

Conventional sizing compositions typically contain one or more film forming polymeric or resinous components, glass-resin coupling agents, and one or more lubricants, emulsifiers, and/or antistatic agents dissolved or dispersed in a liquid medium. The film forming component of the size composition is desirably selected to be compatible with the matrix resin or resins in which the glass fibers are to be embedded. The sizing composition protects the fibers from interfilament abrasion and promotes compatibility and adhesion between the glass fibers and the matrix in which the glass fibers are to be used.

Numerous problems exist with existing technologies used to make composite parts and with the composites themselves. For example, the thermoplastic and thermosetting polymer materials commonly used in these systems are solvent-based systems. As a result, volatile organic compounds (VOC's) may be released into the atmosphere as the part is cured. One potential polymer system that may be used to reduce the amount of volatile organic compounds that are emitted into the environment and provide a friendlier workplace is a powder coating system. Powder coating is a coating that is applied as a dry powder to produce a colored surface finish on a part. As a result, such a powder coating system releases little or no volatile organic compounds.

Additionally, in conventional compression and injection molding processes, the resin and the glass fibers are generally combined in a separate step prior to molding, which adds to the manufacturing costs. For instance, in a typical SRIM process, the reinforcement fibers and polymer resin are introduced individually to molding equipment, after which, the part is molded. In these types of molding techniques, composite parts may be formed that have inadequately dispersed reinforcement materials if the machine is not calibrated properly. Further, the amount of fiber content that may be introduced in injection and compression molding processes is limited due to the process itself, as is known in the art. Because conventional molding processes contain a lower fiber content and because matrix resins are more generally expensive than the reinforcement fibers, the cost of the composite part is increased.

In the production of structural composites, the sizing composition should be highly soluble so that the individual fibers are sufficiently dispersed or wetted by the matrix resin. The high solubility promotes better fiber strand defilamentation, or strand break up, which reduces fiber prominence and thus improves the uniformity or smooth appearance of the surface of the resulting composite. Additionally, the high solubility promotes an increased interface between the individual fibers and the matrix resin and results in better mechanical properties, which are needed for structural applications.

It is desirable that the strands remain in a bundled formation until the proper time for defilamentation. Accordingly, a need exists in the art for an improved size composition that exhibits a high solubility, is easy to manufacture, and is easily applied to glass fibers. It is also desirable to provide a method for combining the powder coating industry and glass fiber industry for making structural composite parts, to increase the fiber content in structural composite parts to improve or maintain mechanical properties such as strength or impact resistance, and to simplify the manufacturing of structural composite parts by introducing the polymer resin and fiber reinforcement material in one step to be molded to a desired shape.

SUMMARY OF THE INVENTION

It is an object of the invention to provide an aqueous sizing composition that includes an epoxy resin emulsion film former, at least one epoxy silane coupling agent, at least one non-ionic lubricant, at least one cationic lubricant, and at least one organic acid. The epoxy resin emulsion contains a high weight epoxy resin and at least one surfactant. The epoxy resin may have an epoxy equivalent weight from 450-950. In exemplary embodiments, the epoxy resin may have an epoxy equivalent weight from 500-850. The organic acid may be selected from citric acid, acetic acid, formic acid, succinic acid, boric acid, and combinations thereof. In addition, the sizing composition may have a solubility in acetone from about 30% to about 75%.

It is another object of the present invention to provide a powder coated roving for making a structural composite. The powder coated roving includes a bundle of fibers formed of a plurality of substantially parallel glass fibers positioned in a bundled orientation to form a coated fiber bundle and a powder coating at least substantially surrounding the bundle of fibers. The fibers are coated with a size composition that includes (1) an epoxy resin emulsion containing a high weight epoxy resin having an epoxy equivalent weight from 450-950 and at least one surfactant, (2) at least one epoxy silane coupling agent, (3) at least one non-ionic lubricant, (4) at least one cationic lubricant, and (5) at least one organic acid. In addition, the size composition may have a solubility in acetone from about 30% to about 75%. The size composition not only maintains bundle integrity during processing (e.g., the formation of the roving, the powder coating the roving, and forming the preform) but also assists in filamentizing the bundles during a molding step to form a structural composite that is aesthetically pleasing. In exemplary embodiments, the outer surface of the outer fibers of the bundle is coated with the powder coating, leaving the inner fibers free or substantially free of the powder coating material. The powder coating may form between approximately ten and eighty percent by weight of the dry total weight of the composite roving.

It is a further object of the present invention to provide a method for forming a composite roving that includes (1) applying an aqueous powder coating to an outer portion of a bundle of fibers formed of a plurality of substantially parallel glass fibers positioned in a bundled orientation to form a coated fiber bundle and (2) drying the coated fiber bundle to remove water from the aqueous powder coating. The fibers are at least partially coated with a size composition that maintains the glass fibers in the bundled orientation during processing and releases the fibers from their bundled formation during molding. The size composition includes (1) an epoxy resin emulsion containing a high weight epoxy resin having an epoxy equivalent weight from 450-950 and at least one surfactant, (2) at least one epoxy silane coupling agent, (3) at least one non-ionic lubricant, (4) at least one cationic lubricant, and (5) at least one organic acid. The sizing composition may have a solubility in acetone from about 30% to about 75%.

It also object of the present invention to combine the technologies of the powder coating and glass fiber industry to make a structural composite material having good mechanical properties, increased reinforcement content, and simplified manufacturing techniques.

It is an advantage of the present invention that the retention of fiber bundles allows the preform to have a higher glass content per volume than conventional preforms.

It is another advantage of the present invention that the increased glass content imparted by the bundles provides improved mechanical and impact performance.

It is another advantage of the present invention that the epoxy resin emulsions are substantially color free and disperse easily in water.

It is a further advantage that preforms formed using chopped powder coated rovings according to the invention are isotropic.

The above objects are accomplished by producing a unique powder coated composite roving material that is subsequently chopped, preformed, and introduced to a compression mold to form reinforced composite parts. A unique feature of the present invention is that the composite roving material is formed by introducing a powder coating to the outside fibers of a high integrity bundle of inorganic or organic fibers held together by a sizing composition. The powder coating is attached and partially melts around the outside fibers, leaving the internal, sized fibers bundled together.

The fiber-reinforced composite parts have a higher fiber content than is generally found in other fiber-reinforced composites due at least in part to the fact that the part may be formed from one source, as compared with traditional techniques, such as injection molding, that involve introducing the reinforcement material and polymer resin separately. Additionally, the mechanical properties are improved due to the high reinforcement fiber content in the composite part. Further, molding costs are decreased due to simplified molding techniques involving only the chopped powder-coated composite material as compared with the conventional separate introduction of the reinforcement fibers and polymer resin to an injection mold.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figures 1, 8:
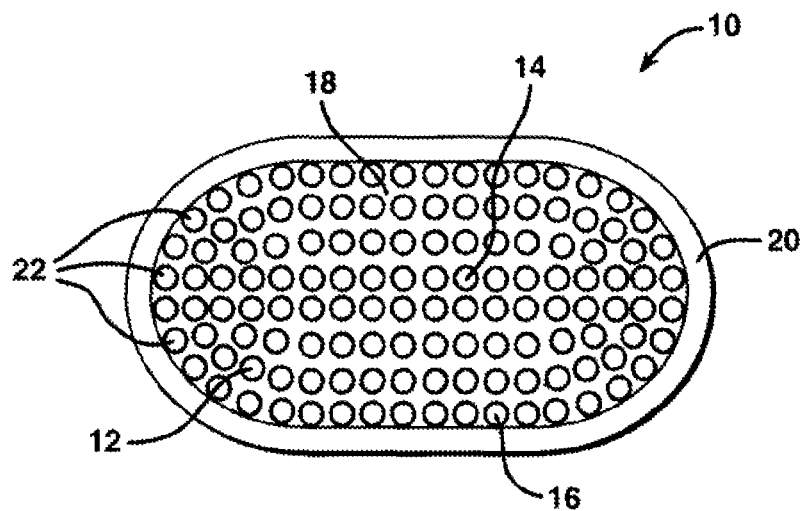
FIG. 1 is an end view of one strand of a composite roving material used to make a composite part according to a preferred embodiment of the present invention.
FIG. 8 depicts a table comparing various mechanical properties of composite parts having varying fiber contents according to the present invention with other traditionally available reinforced composite parts.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. In the drawings, the thickness of the lines, layers, and regions may be exaggerated for clarity. It is to be noted that like numbers found throughout the figures denote like elements. The terms "top", "bottom", "side", "upper", "lower" and the like are used herein for the purpose of explanation only. It will be understood that when an element is referred to as being "on," another element, it can be directly on or against the other element or intervening elements may be present.

The terms "sizing", "size", "size composition" and "sizing composition" may be used interchangeably herein. In addition, the terms "fiber" and "reinforcing fiber" may be interchangeably used herein. Further, the phrase "solubility in acetone" and "acetone solubility" may be used interchangeably within this application.

Referring first to FIG. 1, a powder coated composite multiend roving 10 used for making a structural composite according to a preferred embodiment of the present invention is depicted. The roving 10 is formed of a bundle of fibers 12, which, in turn, is formed of a plurality of inner fibers 14 and a plurality of outer fibers 16. The fibers 14, 16 are held together by a high integrity sizing composition 18. In addition, the individual fibers 14, 16 are positioned in a substantially parallel orientation to each other in a tight knit or "bundled" formation. As used herein, the phrase "substantially parallel" is meant to denote that the individual fibers 14, 16 are parallel or nearly parallel to each other. The high integrity size composition may comprise approximately 0.5 to 5% by weight of the total weight of the bundle of fibers 12. In addition, the bundle 12 may contain between approximately 500 and 1100 filaments of inner fibers 14 and outer fibers 16. Further, the fibers 14, 16 may be approximately 8-16 microns in diameter.

Suitable fibers that may be used in the present invention should be thermally stable, particularly at the temperatures involved in forming the composite structure, and may be any type of glass fiber, such as A-type glass fibers, C-type glass fibers, E-type glass fibers, S-type glass fibers, ECR-type glass fibers (e.g., Advantex® glass fibers commercially available from Owens Corning), and combinations thereof. The use of other reinforcing fibers such as natural fibers, mineral fibers, carbon fibers, ceramic fibers, and/or synthetic fibers such as polyamide, aramid, and/or polyaramid fibers are considered to be within the purview of the invention. The term "natural fiber" as used in conjunction with the present invention refers to plant fibers extracted from any part of a plant, including, but not limited to, the stem, seeds, leaves, roots, or phloem. Examples of natural fibers suitable for use as the reinforcing fiber material include cotton, jute, bamboo, ramie, bagasse, hemp, coir, linen, kenaf, sisal, flax, henequen, and combinations thereof. In exemplary embodiments, the fibers are E-type glass fibers, S-type glass, and/or carbon fibers.

A powder coating polymer material 20 is applied to outer surfaces 22 of the outer fibers 16 such that the powder coating material surrounds or substantially surrounds the bundle 12. It is desirable that the fibers 14, 16, remain in a bundle 12 during processing (e.g., the formation of the roving, powder coating the roving, and forming the preform) prior to molding, thereby allowing the outer surface 22 of the plurality of outer fibers 16 to be coated with the powder coating 20. As used herein, the phrase "during processing" is intended denote all processes or steps conducted to the fibers prior to a molding step. During this introduction step, some of the powder coating polymer material 20 may enter into the bundle 12. It is to be appreciated, however, that if the powder coating enters the bundle 12, the powder coating polymer material 20 is present in the inner part of the bundle 12 in only a very small or trace amount. In exemplary embodiments, the inner fibers 14 are free or substantially free of the powder coating material. It is desirable that only the outer surface 22 is coated with the powder coating material 20, leaving the inner fibers 14 free of powder coating material 20. The powder coating material 20 forms approximately 10-80% of the weight of the multiend composite roving 10. Additionally, the powder forming the powder coating material may be approximately 1-100 microns in diameter. In at least one exemplary embodiment, the diameter of the powder ranges from 5-10 microns.

In at least one exemplary embodiment of the present invention, the sizing composition 18 is approximately 1.0% by weight of the total weight of the bundle 12 of fibers, the fiber bundle 12 is approximately 12 microns in diameter, the bundle 12 contains approximately 800 individual fibers 14, 16, and the powder coating polymer material 20 comprises approximately 20-30% of the weight of the composite roving 10.

The reinforcing fibers 14, 16 are at least partially coated with the size composition 18, which not only maintains bundle integrity during processing prior to molding but also assists in filamentizing the bundles during a molding step in order to form structural composites that have an aesthetically pleasing look to the finished product. The sizing composition permits for a quick filamentizing of the fiber bundles during the subsequent molding step(s) to form a final composite product, and, as result, a fast wet out of the fibers. In addition, the retention of fiber bundles in the preform creates a preform with a higher glass content than conventional preforms. In turn, this increased glass content provides improved mechanical and impact performance to the final composite part. Further, positioning the powder coating on the outside or external surface of the bundles allows for fast, efficient processing of the composite roving because the water can be removed from the coating quickly and easily.

The sizing composition includes one or more epoxy resin emulsions as a film forming agent, at least one non-ionic lubricant, at least one cationic lubricant, at least one epoxy silane coupling agent, and one or more organic acid. The size composition may be applied to the fibers with a Loss on Ignition (LOI) from about 0.5% to about 2.5% on the dried fiber, and in exemplary embodiments, from about 1.0% to about 1.8%. LOI may be defined as the reduction in weight experienced by the fibers after heating them to a temperature sufficient to burn or pyrolyze the organic size from the fibers. As used in conjunction with this application, LOI may also be defined as the percentage of organic solid matter deposited on the reinforcement fiber surfaces.

The epoxy film forming polymer component of the sizing composition includes epoxy resin emulsions that contain a high molecular weight, solid epoxy resin and at least one surfactant. The film former functions to protect the fibers from damage and imparts compatibility of the fibers with the matrix resin. The epoxy resin may have an epoxy equivalent weight from 450-950, an epoxy equivalent weight from 500-850, an epoxy equivalent weight from 550-750, or an epoxy equivalent weight from 575-700. "Epoxy equivalent weight", as used herein, is defined by the molecular weight of the epoxy resin divided by the number of epoxy groups present in the compound. Useful epoxy resins contain at least one epoxy or oxirane group in the molecule, such as polyglycidyl ethers of polyhydric alcohols or thiols. In one or more exemplary embodiment, the epoxy film forming resin may be AD-503 (commercially available from AOC).

Examples of suitable surfactants for use in the epoxy resin emulsion include, but are not limited to, Triton X-100, an octylphenoxypolyethoxyethanol (available from Union Carbide Corp.), Pluronic P103, an ethylene oxide/propylene oxide block copolymer (available from BASF), Pluronic F77, an ethylene oxide/propylene oxide block copolymer (available from BASF), Pluronic 10R5, an ethylene oxide/propylene oxide block copolymer (available from BASF), a block copolymer of ethylene oxide and propylene oxide such as Pluronic P101 (available from BASF), a polyoxyethylene-polyoxypropylene block copolymer such as Pluronic P105 (available from BASF), and an ethylene oxide/propylene oxide copolymer (available from BASF). In at least one exemplary embodiment, the epoxy resin emulsion contains two or more surfactants. For example, a combination of (1) a block copolymer of ethylene oxide and propylene oxide and (2) a polyoxyethylene-polyoxypropylene block copolymer (such as Pluronic P101 and Pluronic P105) is used in the epoxy resin emulsion. The surfactant or surfactants may be present in the epoxy resin emulsion in an amount from about 10% to about 25%, in an amount from about 12% to about 22%, or in an amount from about 15% to about 18%.

The epoxy resin emulsion is present in the size composition in an amount from about 70% to 95% by weight solids, in an amount from about 80% to about 90% by weight solids, or from about 85% to about 90% by weight solids. As used herein, and unless specifically defined otherwise, the phrase "% by weight" is meant to denote "% by weight solids".

The size composition also includes at least one epoxy silane coupling agent. Silane coupling agents function to enhance the adhesion of the film forming agent to the glass fibers and to reduce the level of fuzz, or broken fiber filaments, during subsequent processing. The coupling agents used in the silane package of the size composition may have hydrolyzable groups that can react with the glass surface to remove unwanted hydroxyl groups and one or more groups that can react with the film-forming polymer to chemically link the polymer with the glass surface. In particular, the coupling agents may include 1 to 3 hydrolyzable functional groups that can interact with the surface of the glass fibers and one or more organic groups that are compatible with the polymer matrix. In particular, suitable coupling agents for use in the silane package have a readily hydrolyzable bond to a silicon atom of the silane, or hydrolysis products thereof.

Coupling agents for use in the sizing composition include monosilanes containing the structure R'Si(OR)$_3$, where R is an organic group such as an alkyl group. Lower alkyl groups such as methyl, ethyl, and isopropyl are preferred. Examples of suitable epoxy silane coupling agents include a glycidoxy polymethylenetrialkoxysilane such as 3-glycidoxy-1-propyl-trimethoxysilane, an acryloxy or methacrylyloxypolymethylenetrialkoysilane such as 3-methacrylyloxy-1-propyltrimethoxysilane, γ-glycidoxypropyltrimethoxysilane (A-187 available from Momentive Performance Materials, Inc.), α-glycidoxypropylmethyldiethoxysilane (A-2287 available from Momentive Performance Materials, Inc.), and α-chloropropyltrimethoxysilane (KBM-703 available from Shin-Etsu Chemical Co., Ltd.). In at least one preferred embodiment, the epoxy silane coupling agent is γ-glycidoxypropyltrimethoxysilane (A-187) described above. The epoxy silane coupling agent may be present in the size composition in an amount from about 4.0% to about 15.0% by weight solids, from about 6.0% to about 12.0% by weight solids, from about 7.0% to about 9.5% by weight solids.

Additionally, the sizing composition contains at least one non-ionic lubricant. The non-ionic lubricant in the sizing composition acts as a "wet lubricant" and provides additional protection to the fibers during the filament winding process. In addition, the non-ionic lubricant helps to reduce the occurrence of fuzz. Especially suitable examples of non-ionic lubricants include PEG 200 Monolaurate (a polyethylene glycol fatty acid ester commercially available from Pulcra) and PEG 600 Monooleate (Pulcra). Other non-limiting examples include a polyalkylene glycol fatty acid such as PEG 600 Monostearate (a polyethylene glycol monostearate available from Pulcra), PEG 400 Monostearate (Pulcra), PEG 400 Monooleate (Pulcra), and PEG 600 Monolaurate (Pulcra). In at least one exemplary embodiment, the non-ionic lubricant is PEG 400 Monooleate. The non-ionic lubricant may be present in the size composition in an amount from about 0.05% to about 3.0% by weight solids, from about 0.1% to about 2.0% by weight solids, or from about 0.5% to about 1.5% by weight solids.

In addition to the non-ionic lubricant, the sizing composition also contains at least one cationic lubricant. The cationic lubricant aids in the reduction of interfilament abrasion. Suitable examples of cationic lubricants include, but are not limited to, a polyethyleneimine polyamide salt commercially available from Pulcra under the trade name Emery 6760L, a stearic ethanolamide such as Lubesize K-12 (AOC), Cirrasol 185AE (Unichemie), and Cirrasol 185AN (Unichemie). The amount of cationic lubricant present in the size composition is preferably an amount sufficient to provide a level of the active lubricant that will form a coating with low fuzz development. In at least one exemplary embodiment, the cationic lubricant is present in the size composition in an amount from about 0.1% to about 2.0% by weight solids, from about 0.3% to about 1.5% by weight solids, or from about 0.5% to about 1.0% by weight solids.

Further, the size composition includes at least one weak acid. In the inventive size composition, a trace amount of citric acid, acetic acid, formic acid, succinic acid, and/or boric acid may be added to the inventive sizing composition to hydrolyze the silane in the coupling agent without prematurely opening the epoxy groups. In exemplary embodiments, the organic acid is citric acid. In exemplary embodiments, the organic acid is present in the size in an amount from about 0.01% to about 1.0% by weight solids, from about 0.05% to about 0.8% by weight solids, or from about 0.1% to about 0.7% by weight solids.

In addition, the sizing may include an antistatic agent. Antistatic agents especially suitable for use in the sizing composition include antistatic agents that are soluble in the sizing composition. Examples of suitable antistatic agents include compounds such as Katax™ 6660A and Katax™ 6665 (quaternary ammonium antistatic agents available from Emery Industries, Inc.), and Larostat 264A (a quaternary ammonium antistatic agent available from BASF), tetraethylammonium chloride, and lithium chloride. Antistatic agents may be present in the size composition in an amount up to 1.0% by weight solids. In exemplary embodiments, the antistatic agent may be present in the size composition in an amount from about 0.01% to about 1.0% by weight solids, from about 0.02% to about 0.6% by weight solids, or from about 0.02% to about 0.06% by weight solids.

The size composition further includes water to dissolve or disperse the active solids for coating. Water may be added in amounts sufficient to dilute the aqueous sizing composition to a viscosity that is suitable for its application to glass fibers and to achieve the desired solids content on the fibers. In preferred embodiments, the sizing composition may contain up to approximately 91% water.

The range of components utilized in the sizing composition in one exemplary embodiment is set forth in Table 1.

TABLE 1

| Sizing Component | % by Weight Solids |
|---|---|
| Epoxy Resin Emulsion | 70-95 |
| Epoxy Silane Coupling Agent | 4-15 |
| Non-Ionic Lubricant | 0.05-3.0 |
| Cationic Lubricant | 0.1-2.0 |
| Citric Acid | 0.01-1.0 |
| Water | balance |

An aqueous sizing composition according to another exemplary embodiment of the present invention is set forth in Table 2.

TABLE 2

| Sizing Component | % by Weight Solids |
|---|---|
| Epoxy Resin Emulsion | 80-90 |
| Epoxy Silane Coupling Agent | 6-12 |
| Non-Ionic Lubricant | 0.1-2.0 |
| Cationic Lubricant | 0.3-1.5 |
| Citric Acid | 0.05-0.8 |
| Water | balance |

In general, the size composition may be made by adding water, the organic acid, and an epoxy silane coupling agent to a main mix container with agitation. The mixture is agitated to hydrolyze the silane coupling agent. Once the silane hydrolysis is complete, a pre-mix containing the non-ionic lubricant, cationic lubricant, and water is added to the main mix container with agitation. Finally, the epoxy resin emulsion is added to the mix container and stirred for a period of time to disperse the epoxy resin.

The integrity of the size composition can be measured, in part, by its acetone solubility. Generally, as the solubility in acetone increases, the integrity of the size decreases. As discussed above, it is desirable to maintain the fibers 14, 16 in a bundled formation until the molding process. The integrity of the size composition permits the powder coating to be applied to the fiber bundles and not to individual, filamentized fibers. The acetone solubility of the size composition may be determined using a Soxhlet extractor, as is well-known to those of skill in the art, which gives a rough estimation or measurement of the integrity of the size composition. The inventive sizing composition may have an acetone solubility from about 30% to about 75%, from about 40% to about 60%, or from about 45% to about 55%.

Figure 2:
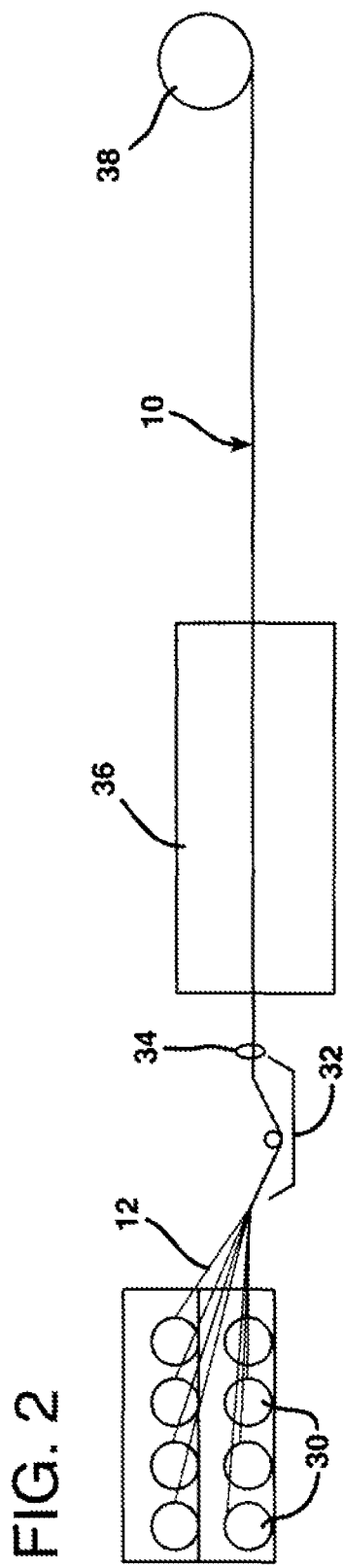
FIG. 2 is a schematic diagram for making the composite roving of FIG. 1.

During formation of the bundle, the bundle 12 is flattened out when wound on a tube that makes a forming cake (shown as 30 in FIG. 2). Accordingly, an end view of the flattened bundle 12 provides a generally elliptical cross section. The elliptical cross section provides for greater surface area of the bundle 12 that is exposed to the powder coating material 20. Of course, in other embodiments, the cross sectional shape may be round or irregularly shaped as opposed to generally elliptical.

The powder coating 20 that is used is made of a slurry or emulsion coating having a powdered polymer material. The powdered polymer material is a good wetting matrix resin that is capable of being applied as a dip coating at room temperature. The polymer powder coating material 20 should also be capable of melting, flowing, and curing when it is molded into a final composite part. Many different powdered polymers may be used, including polyesters, bisphenol type epoxies, novolac type epoxies, phenolics, acrylics, polyurethanes, hybrid polymers (for example, an epoxy polyester copolymer or a polyester triglycidylisocyanurate copolymer), and other thermoplastic or thermosetting polymers that exhibit good wetting and processability for making a structural composite part. In addition, the powder coating 20 may contain film formers (e.g., polyurethanes) that aid in attaching the powdered polymer material to the bundles 12. Also, the powder coating 20 typically contains additives that aid in dispersing the powdered polymer material in the film former and water and in thickening the slurry to a desired viscosity. One exemplary powder coating slurry is set forth in Table 3.

TABLE 3

| Name | Description | Weight | Solids |
|---|---|---|---|
| Blue 49/00340 (Tiger Drylac USA, Inc.) | Polyester - triglycidyl isocyanurate powder coating | 500 | 100% |
| Bayer Baybond PU403 | Polyurethane resin film former | 107 | 40% |
| Igepal CA-630 (Rhone-Poulenc) | Polyacrylamide Resin | 12 | 100% |
| DrewFloc (1%) (Ashland Chemical/Drew Industrial) | Thickener | 100 | 1% |
| Water | | 669 | |
| TOTALS | | 1388 | 40% |

Table 3 depicts one exemplary composition of a powder coating 20 used to coat or at least substantially coat the bundle 12. The slurry may be made by first mixing together the polyurethane, polyacrylamide, thickener, and water with agitation to form a pre-mix. The powdered polymer material may then be added slowly to the pre-mix with agitation to produce a slurry bath having approximately 40% solids. The slurry bath may be maintained under agitation during the application process to ensure that the powder polymer material remains evenly dispersed within the slurry bath.

FIG. 2 shows a schematic diagram for making the multiend composite roving 10 of FIG. 1. Individual sized, bundled fibers 12 may be unrolled from a plurality of forming cakes 30 and introduced through a bath containing the powder coating polymer material 20 dispersed in a slurry or emulsion. The aqueous powder coated slurry is, in exemplary embodiments, approximately 40% solids, and is adhered to the outer fibers 16 of the bundle 12 to form the composite roving material 10. A stripper die 34 may be used to meter the amount of powder coating 20 on the coated bundle 12. The amount of powder coating material 20 metered onto the bundle 12 may be controlled by varying the size of the orifice (not shown) in the stripper die 34. The coated bundle 12 may then be sent through a drying oven 36 to remove water from the powder coating material 20. The drying oven 36 should be maintained at a temperature high enough to remove the water from the powder coating 20 but low enough to prevent the powder coating material 20 from significant melting. The dried composite roving 10 may then be cooled and wound up onto a multiend roving package 38 for additional processing.

In alternative embodiments, a squeegee (not shown) may be used instead of or in conjunction with the stripper die 34 to meter the amount of powder coating 20 applied to the bundle 12. In addition, coated bundle 12 may simply be air dried as opposed to dried using a drying oven 36 as shown in FIG. 2.

Figure 3:
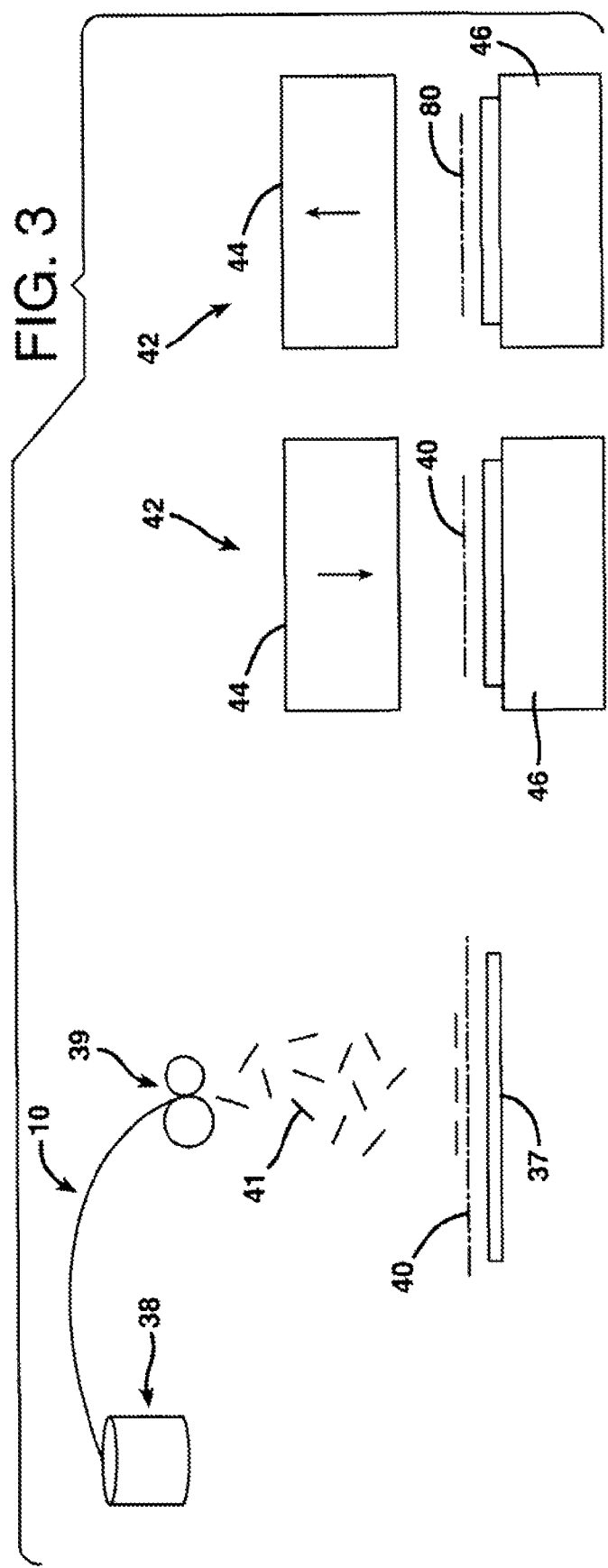
FIG. 3 is a schematic diagram of one preferred way for making a composite part from the composite roving of FIG. 1.

Referring now to FIG. 3, a schematic diagram for making a composite part 80 from the composite roving material 10 is shown. The dried composite roving material 10 may be unwound from the creel 38 and introduced to a chopper 39. The chopper 39 then chops the composite roving material 10 onto a preform screen 37, thereby forming a preform 40 from the chopped composite roving material 41. The preform formed is an isotropic preform. A vacuum (not shown) may be used to ensure that the chopped roving material 41 falls onto the preform screen 37 in a manner consistent with the design of the composite part 80. The preform 40 may then be heat consolidated to form a handleable preform. The handleable preform 40 containing the chopped roving material 41 may be placed in a heated press 42 and compression molded at a chosen pressure, preferably 300-1200 pounds per square inch, to form a composite part 80 having a desired, preselected shape. The upper mold section 44 of the heated press 42 is maintained at an elevated temperature high enough to cause the powdered polymer coating 20 on the bundle 12 to melt, flow, and cure. In one or more exemplary embodiments, this elevated temperature is between 300 and 450 degrees Fahrenheit. During the curing process, the fiber bundles 12 flatten out as the sizing composition 18 melts slightly. This slight melting permits for some of the powder coating material 20 to seep within the inner fibers 14 and allows for the removal of air from the composite part 80 to prevent the formation of voids, thereby giving the composite part 80 enhanced structural integrity. The upper mold section 44 and lower mold section 46 of the press 42 are held together for a period of time sufficient to ensure that the powder coated material 20 has completely reacted and to ensure that the fiber bundle 12 has compressed to the desired thickness. The composite part 80 may then be released from the mold 42 and cooled.

Figure 4:
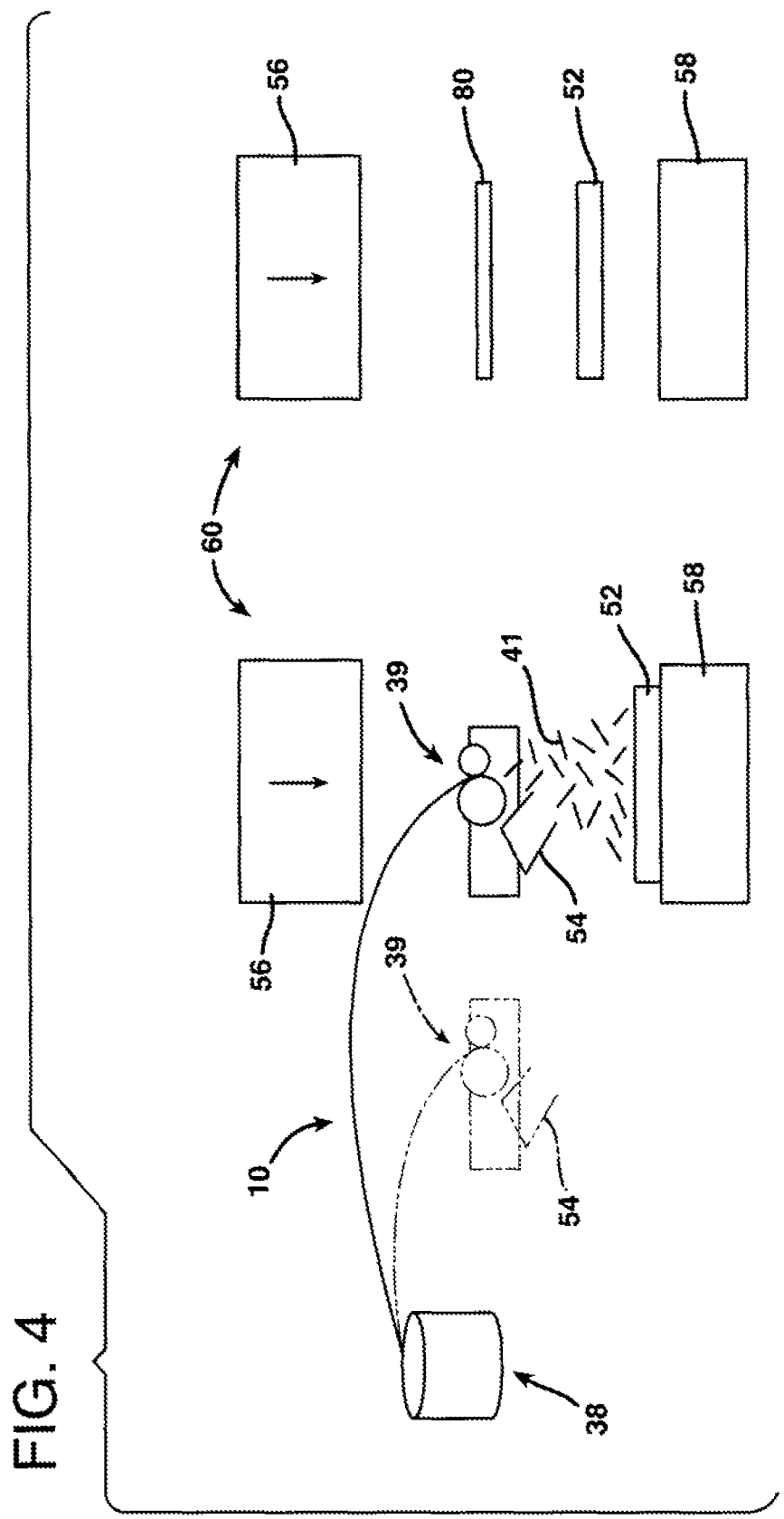
FIG. 4 is a schematic diagram of another preferred way for making a composite part from the composite roving material of FIG. 1.

In an alternate process depicted in FIG. 4, the composite roving material 10 may be chopped in the presence of a hot air source device 54 that impacts the chopped composite roving material 41 as it leaves the chopping head of the chopper 39. The hot air source device 54 melts a portion of the powder coating material 20 on the powder coated roving material 10 to make the powder coating 20 tacky without cure occurring. The tacky strands then impact a mold 52 with enough force and at a sufficiently high temperature to keep the powder coating 20 warm without reversibly curing the powder coating material 20. In one or more exemplary embodiment, the temperature is between about 300 and about 360 degrees Fahrenheit.

The chopper 39 is then removed and the mold 52 containing the chopped roving material 41 is placed in a press 60 and compression molded at a chosen pressure to form a composite part 80 as is shown in FIG. 3. The upper mold section 56 of the press 60 is maintained at a temperature high enough to cause the powdered polymer coating 20 on the bundle 12 to melt, flow, and cure. In exemplary embodiments, this elevated temperature is between about 300 and about 450 degrees Fahrenheit. During the curing process, the fiber bundles 12 flatten out as the sizing composition 18 melts slightly. This slight melting allows for seepage of some of the powder coating material 20 within the inner fibers 14 and allows air movement within the composite part 80, thereby giving the composite part 80 better flow characteristics and enhanced structural integrity. The upper mold section 56 and lower mold section 58 of the press 60 are held together for a sufficient amount of time to ensure that the powder coated material 20 has completely reacted and to ensure that the fiber bundle 12 has compressed to its required thickness. The composite part 80 may then be released from the mold 52 and press 60 and cooled.

Figure 5:
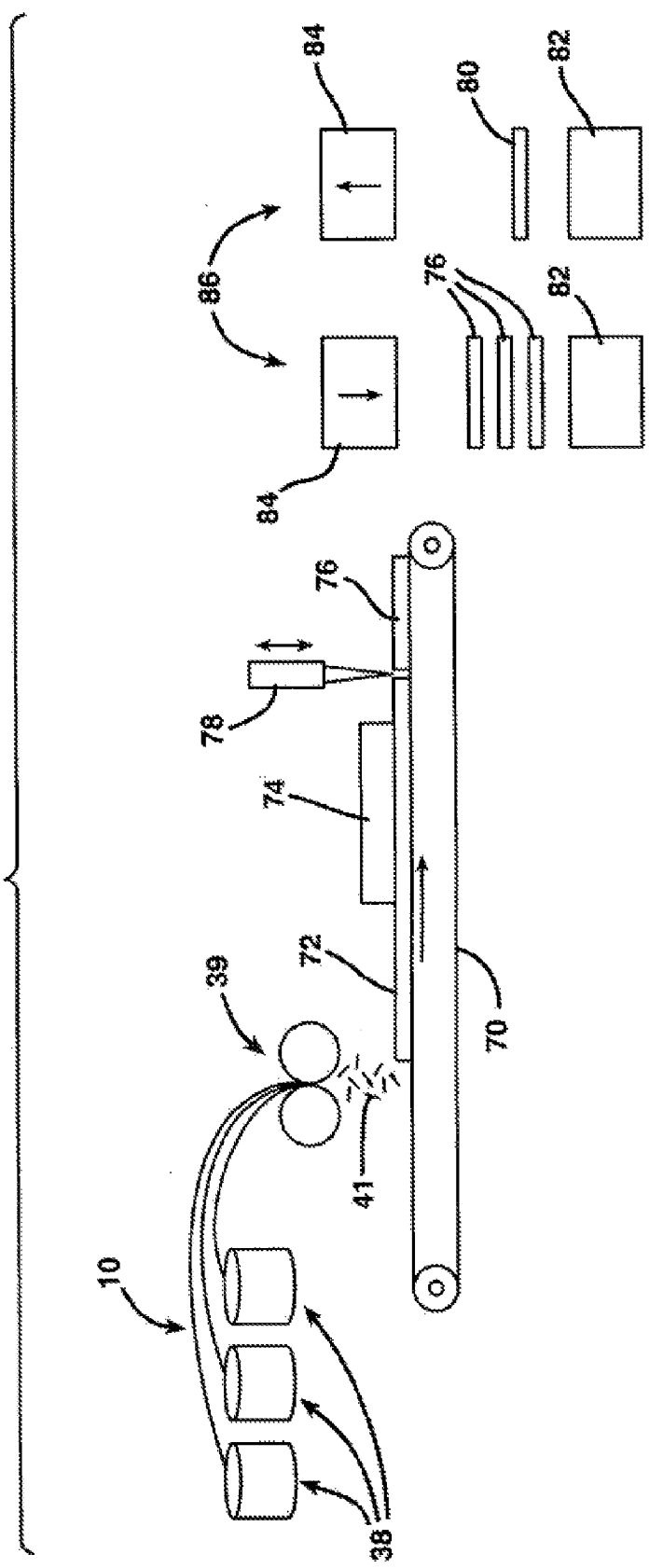
FIG. 5 is a schematic diagram of another preferred way for making a composite part from the composite roving material of FIG. 1.

Referring now to FIG. 5, another exemplary method for making a composite part 80 from the composite roving material 10 is depicted. In this embodiment, the dried composite roving material 10 may be unwound from the creel 38 and introduced to a chopper 39. The chopper 39 chops the composite roving material 10 and drops it onto a moving belt 70 to form a sheet 72 of the chopped roving material 41. The chopped roving material 41 may then be compacted and heated in a press 74 and chopped to an appropriate size and shape by a chopping blade 78 to form a preform 76.

One or more preform 76 may be placed into a press 86 and compression molded at a chosen pressure to form a composite part 80. The upper mold section 84 of the press 86 is maintained at a temperature high enough to cause the powdered polymer coating 20 on the bundle 12 to melt, flow, and cure. In exemplary embodiments, this elevated temperature is between about 300 and about 450 degrees Fahrenheit. During the curing process, the fiber bundles 12 flatten out as the high integrity sizing composition 18 melts slightly. This slight melting allows for seepage of some of the powder coating material 20 within the inner fibers 14 and allows air movement within the composite part 80, thereby giving the composite part 80 better flow characteristics and enhanced structural integrity. The upper mold section 84 and lower mold section 82 of the press 86 are held together for a period of time sufficient to ensure that the powder coated material 20 has completely reacted and to ensure that the fiber bundle 12 has compressed to its required thickness. The composite part 80 may then be released from the press 86 and cooled.

Figure 6:
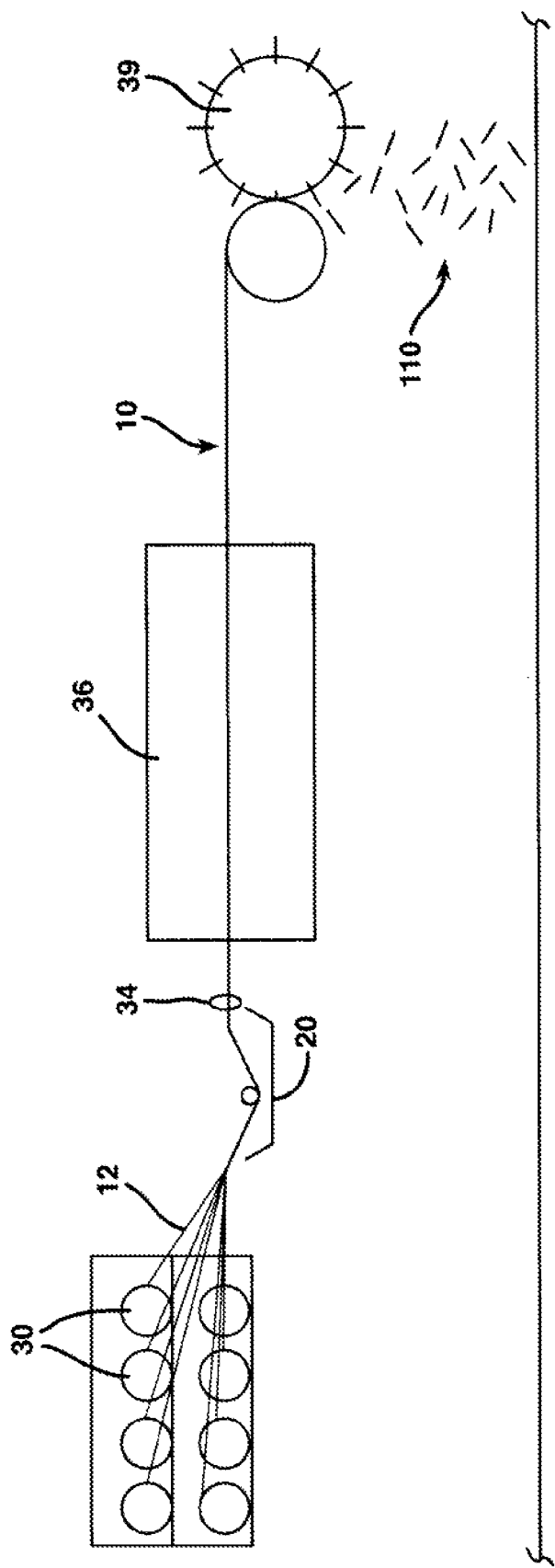
FIG. 6 is a schematic diagram for making moldable chop to be used to make a composite part from the composite roving of FIG. 1.

Referring now to FIG. 6, a schematic diagram for making a moldable chop 110 is shown. In this exemplary embodiment, individual sized bundled fibers 12 are unrolled from a plurality of forming cakes 30 and introduced through a bath containing the powder coating polymer material 20 dispersed in a slurry or emulsion. In one or more exemplary embodiment, the aqueous powder coated slurry is approximately 40% solids and is adhered to the outer fibers 16 of the bundle 12 to form the composite roving material 10. A stripper die 34 may be used the meter the amount of powder coating 20 on the coated bundle 12. The amount of powder coating material 20 metered onto the bundle 12 may be controlled by varying the size of the orifice (not shown) in the stripper die 34. The coated bundle 12 may then be sent through a drying oven 36 to remove water from the powder coating material 20 that forms the composite roving material 10. The drying oven 36 should be maintained at a temperature hot enough to remove the water from the powder coating 20 but cool enough to prevent the powder coating material 20 from significant melting. The composite roving material 10 may be chopped to approximately one-half inch moldable chop 110 in length using a chopper 39 and stored in a container (not shown) for later use.

The moldable chop 110, having a size of approximately one-half inch, is similar to or smaller in size than the chopped composite roving material 41 of FIGS. 3-5. This sizing allows the chop 110 to be easily poured from the container into a mold for compression molding. The size of the moldable chop 110 forms a composite part 80 (not shown) having good reinforcing characteristics. Alternatively, the chop 110 could be layered onto the preform 40 as in FIG. 3 to form a molded composite part 80 having different length fibers for different reinforcing applications.

Figure 7C:
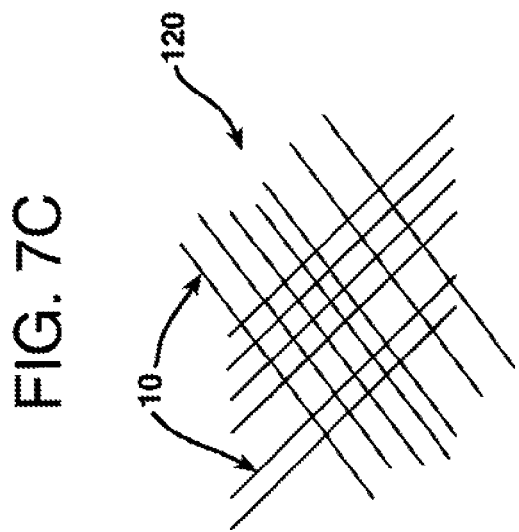
FIGS. 7A, 7B, and 7C illustrate weaving patterns that can be formed from the composite roving material of FIG. 1 that may be subsequently molded into a composite part.
Figure 7B:
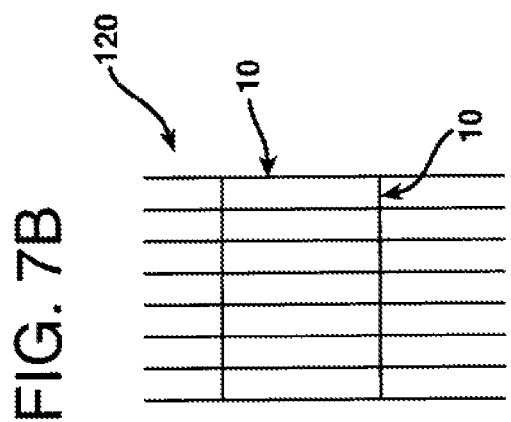
Figure 7A:
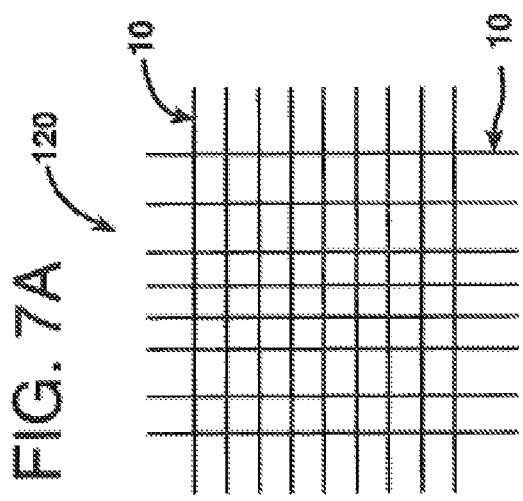

Referring now to FIGS. 7A, 7B, and 7C, it can be seen that the composite roving material 10 of FIG. 1 may be alternatively processed prior to chopping, as depicted in FIGS. 3-6. Here, the composite roving material 10 may be woven, as shown in FIG. 7A, knitted, as depicted in FIG. 7B, or braided, as shown in FIG. 7C, in a manner similar to what known in the fiberglass industry to form a fabric 120. One or more layers of the fabric 120 may then be placed in a mold and compression molded as described above with respect to FIG. 3 to form composite parts 80 having unique reinforcing characteristics.

While some seepage of the powder coating material 20 into the plurality of inner fibers 14 may occur when compression molding the composite part 80 as shown in FIGS. 3-6, most of the powder coating material 20 is maintained along the outer surface 22 of the outer fibers 16 around the bundle 12. This is an important aspect of the present invention, as this arrangement produces composite parts 80 having good mechanical properties including impact resistance.

FIG. 8 compares and contrasts mechanical properties of structural reaction injection molding ("SRIM"), sheet molding compound ("SMC"), 70% fiber composite part, and 75% fiber composite part according to the present invention. As illustrated in FIG. 8, the composite parts 80 of the present invention demonstrated improved tensile strength, tensile modulus, flex stress, and impact resistance (both notched and unnotched Izod) compared to similar size and shaped SRIM and SMC composite parts made with non-composite rovings. Further, the higher fiber content in the composite part improved tensile modulus, flex stress, and impact resistance compared with the lower fiber content composite parts.

The present invention offers many advantages over typical structural composite materials in terms of mechanical properties, cost and processing. For instance, the volatile organic content (VOC) that may be released to the atmosphere during the processing steps for the present invention is minimal. Also, the composite parts 80 of the present invention offer good mechanical properties due to their high fiber content. In addition, the process used to make the composite parts 80 is simple, thus minimizing the manufacturing costs, particularly when compared with other structural composites. For example, in a typical SRIM process, the reinforcement materials and polymer resin are introduced individually to the molding equipment and the part is molded, which adds to the cost of manufacture. Also, because the powdered polymer material 20 is added in metered amounts to the outside of the fiber bundles 12, the composition of the final composite parts 80 may be precisely controlled compared to other structural composite systems where the polymer resin material and fiber content are separately introduced into an injection mold or similar apparatus. Because the polymer is present on the bundle of fibers, the structural and mechanical properties of the composite part 80 can be more precisely controlled from part to part.

Similarly, aesthetic properties of the composite parts 80 of the present invention may be more precisely controlled and enhanced. For example, dyes or colored powders may be added to the powder coating material 20, and the coated bundles may then be molded into the final composite part 80.

Additionally, problems inherent with processing and manufacturing composite parts having a high fiber content are reduced or even eliminated in the present invention. As polymer resins are typically more expensive than the fiber reinforcement material, the cost of the composite part is correspondingly decreased as more fiber is introduced. In addition, composite parts having fiber contents surpassing 70% or more may be realized with the present invention. Further, cost savings both in terms of manufacturing costs and raw material costs are realized by the present invention.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. An aqueous sizing composition comprising:
   80-90% by weight solids of an epoxy resin emulsion containing at least one surfactant and an epoxy resin having an epoxy equivalent weight from about 450 to about 950;
   at least one epoxy silane coupling agent;
   0.1-3.0% by weight solids of at least one non-ionic lubricant;
   0.5-2.0% by weight solids of at least one cationic lubricant;
   0.1-1.0% by weight solids of at least one organic acid, and water, wherein said aqueous sizing composition has a solubility in acetone from about 30% to about 75%.

2. The aqueous sizing composition of claim 1, wherein said solubility in acetone is from about 40% to about 60%.

3. The aqueous sizing composition of claim 1, wherein said organic acid is selected from citric acid, acetic acid, formic acid, succinic acid, boric acid and combinations thereof.

4. The aqueous sizing composition of claim 1, wherein said epoxy resin has an epoxy equivalent weight about 500 to about 850.

5. The aqueous sizing composition of claim 1, wherein said at least one epoxy silane coupling agent is γ-glycidoxypropyltrimethoxysilane and said at least one organic acid is citric acid.

6. The aqueous sizing composition of claim 1, wherein;
   said at least one epoxy silane coupling agent is present in said sizing composition in an amount from 4.0% to 15.0% by weight solids;
   said at least one non-ionic lubricant is present in said sizing composition in an amount from 0.5% to 1.5% by weight solids;
   said at least one cationic lubricant is present in said sizing composition in an amount from 0.5% to 1.0% by weight solids; and
   said at least one organic acid is present in said sizing composition in an amount from 0.05% to 0.8% by weight solids.

7. A powder coated roving for making a structural composite, said powder coating roving comprising:
   a bundle of fibers formed of a plurality of substantially parallel inner glass fibers and outer glass fibers, the outer glass fibers defining an outer surface of the bundle, said glass fibers being at least partially coated with a sizing composition having a solubility in acetone from about 30% to about 75% wherein said outer surface of said plurality of outer fibers is fully coated with a powder coating.

8. The powder coated roving of claim 7, wherein said sizing composition maintains the inner and outer glass fibers together in said bundle during processing, but allows said glass fibers to filamentize during a molding step.

9. The powder coated roving of claim 7, wherein only an outer surface of said plurality of outer fibers is coated with said powder coating.

10. The powder coated roving of claim 7, wherein said sizing composition comprises:
- 80-90% by weight solids of an epoxy resin emulsion containing at least one surfactant and an epoxy resin having an epoxy equivalent weight from about 450 to about 950;
- at least one epoxy silane coupling agent;
- 0.1-3.0% by weight solids of at least one non-ionic lubricant;
- 0.5-2.0% by weight solids of at least one cationic lubricant;
- 0.1 to 1.0% by weight solids of at least one organic acid; and
- water.

11. The powder coated roving of claim 7, wherein said epoxy resin has an epoxy equivalent weight from about 500 to about 850.

12. The powder coated roving of claim 11, wherein said powder coating comprises between approximately ten and eighty percent by weight of the dry total weight of said composite roving.

13. A method for forming a composite roving comprising:
- positioning a plurality of substantially parallel glass fibers in a bundled orientation having an outer portion;
- applying an aqueous powder coating to the entire outer portion of said bundle of fibers forming a fully coated fiber bundle, said glass fibers being fully coated with a sizing composition that maintains said plurality of glass fibers in said bundled orientation during processing prior to molding of said bundle of fibers; and
- drying said coated fiber bundle to remove water from said aqueous powder coating, wherein said size composition has a solubility in acetone from about 30% to about 75%.

14. The method of claim 13, wherein said sizing composition has a solubility in acetone from about 40% to about 60%.

15. The method of claim 13, wherein said sizing composition comprises:
- 80-90% by weight solids of an epoxy resin emulsion containing at least one surfactant and an epoxy resin having an epoxy equivalent weight from about 450 to about 950;
- at least one epoxy silane coupling agent;
- 0.1-3.0% by weight solids of at least one non-ionic lubricant;
- 0.5-2.0% by weight solids of at least one cationic lubricant;
- 0.1-1.0% by weight solids of at least one organic acid; and
- water.

16. The method of claim 15, wherein said epoxy resin has an epoxy equivalent weight from about 500 to about 850.

17. The method of claim 13, wherein only an outer surface of said plurality of outer fibers is coated with said powder coating.

18. The method of claim 13, further comprising:
- chopping said composite roving into a plurality of chopped strands having a desired length; and
- molding said plurality of chopped strands to a desired shape to form a structural composite part.

19. The method of claim 18, wherein said sizing composition releases said fibers from said bundle during said molding step.

20. The method of claim 13, wherein said aqueous powder coating comprises water, at least one powdered polymer, and at least one member selected from a film former and a thickener.

* * * * *